United States Patent
Sagong et al.

(10) Patent No.: US 9,094,759 B2
(45) Date of Patent: Jul. 28, 2015

(54) EARPHONE CONNECTION DETECTING SYSTEM AND MOBILE DEVICE FOR SUPPORTING THE SYSTEM

(71) Applicant: Samsung Electronics Co., Ltd., Suwon-si, Gyeonggi-do (KR)

(72) Inventors: Jin Sagong, Suwon-si (KR); Harksang Kim, Seoul (KR); Sangeun Kim, Seoul (KR); Taegyun Kim, Daejeon (KR); Jaeyong Sim, Seoul (KR); Taeyoon An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 13/709,310

(22) Filed: Dec. 10, 2012

(65) Prior Publication Data
US 2013/0148820 A1    Jun. 13, 2013

(30) Foreign Application Priority Data
Dec. 13, 2011    (KR) ........................ 10-2011-0133617

(51) Int. Cl.
*H04R 1/10* (2006.01)
*H04M 1/725* (2006.01)
*H04M 1/60* (2006.01)

(52) U.S. Cl.
CPC ......... *H04R 1/1041* (2013.01); *H04M 1/72527* (2013.01); *H04M 1/6058* (2013.01); *H04R 2420/09* (2013.01)

(58) Field of Classification Search
None
See application file for complete search history.

(56) References Cited

U.S. PATENT DOCUMENTS

| | | | |
|---|---|---|---|
| 7,789,697 B2 * | 9/2010 | Fiennes | 439/489 |
| 2002/0050919 A1 * | 5/2002 | Vance | 338/47 |
| 2003/0213686 A1 * | 11/2003 | Takeuchi et al. | 200/406 |
| 2005/0057515 A1 * | 3/2005 | Bathiche | 345/168 |
| 2007/0049103 A1 | 3/2007 | Kashi et al. | |
| 2008/0264770 A1 * | 10/2008 | Purcocks | 200/521 |
| 2009/0061694 A1 | 3/2009 | Kawasaki et al. | |
| 2010/0006413 A1 * | 1/2010 | Chang et al. | 200/314 |
| 2010/0083116 A1 * | 4/2010 | Akifusa et al. | 715/727 |
| 2010/0303255 A1 * | 12/2010 | Im et al. | 381/94.1 |
| 2011/0237131 A1 | 9/2011 | Fields et al. | |
| 2011/0242361 A1 * | 10/2011 | Kuwahara et al. | 348/231.4 |
| 2012/0099742 A1 * | 4/2012 | Edeler | 381/120 |
| 2012/0281845 A1 * | 11/2012 | Siotis | 381/56 |
| 2013/0070947 A1 * | 3/2013 | Chien et al. | 381/332 |

FOREIGN PATENT DOCUMENTS

GB    2 330 276 A    4/1999

* cited by examiner

*Primary Examiner* — Brenda Bernardi
(74) *Attorney, Agent, or Firm* — Jefferson IP Law, LLP

(57) ABSTRACT

A system for detecting the connection of an earphone system to a mobile device is provided. The earphone connection detecting system detects an electrical change from a mechanical change according to the insertion of the earphone jack plug of the earphone system to the jack interface of the mobile device, via a switching device electrically isolated from the earphone system, thereby identifying the connection of the earphone system to the mobile device.

16 Claims, 5 Drawing Sheets

EARPHONE CONNECTION DETECTING SYSTEM AND MOBILE DEVICE FOR SUPPORTING THE SYSTEM

FIELD OF THE INVENTION

This invention relates to a system that can correctly detect the connection of an earphone to a mobile device, without generating noise. The invention also relates to a mobile device with the earphone connection detecting system.

DESCRIPTION OF THE RELATED ART

Mobile devices have been widely used because they can be easily carried. Most people in the Republic of Korea are using mobile devices since the devices allow users to make a voice call while they are moving. Such conventional mobile devices are equipped with various types of functions in addition to the function of communicating voice call information between a caller and a called party. For example, a conventional mobile device has a file playback function, such as an MP3 player, and an image collecting function, such as a digital camera. Conventional mobile devices can also support functions for playing a mobile game or an arcade game, etc.

Conventional mobile devices are equipped with earphone systems that allow the users to hear the audio sound clearer or to prevent it from being exposed. Therefore, mobile device users can hear music or broadcasts via the earphone systems, irrespective of time and place. A conventional earphone system detects the connection of earphones to a mobile device when the jack plug of the earphones is electrically connected to the jack interface of the mobile device. In general, users first fit earphones in their outer ears and then insert the conventional earphone system to a mobile device that is turned on. However, during the connection of the conventional earphone system to the mobile device, electrical noise is generated and this inconveniences users.

In addition, conventional earphone connection detecting systems have used a ground contact of the earphone in order to check the electrical contact state. However, this configuration cannot detect, if earphones are in an electrical short state, whether the jack plug is inserted to a mobile device.

DETAILED DESCRIPTION OF INVENTION

Technical Problems

The invention has been made in view of the above problems, and provides a system that can correctly detect the connection of an earphone to a mobile device, without generating noise. The invention further provides a mobile device with the earphone connection detecting system.

Technical Solutions

In accordance with an exemplary embodiment of the invention, the invention provides a mobile device that supports an earphone connection detecting system, including: a jack interface with a cavity to which an earphone jack plug of an earphone system is inserted; a switching device, placed in the cavity, for performing a switching operation by a physical force according to the insertion of the earphone jack plug to the cavity; a detection circuit, electrically connected to the switching device, for generating an electrical change according to the switching operation of the switching device; and a controller, connected to the detection circuit, for detecting the insertion of the earphone jack plug to the jack interface via the electrical change.

In accordance with another exemplary embodiment of the invention, the invention provides an earphone connection detecting system including: an earphone system with an output control unit and a jack plug connected to the output control unit, wherein the output control unit outputs audio signals and the jack plug; and a mobile device with a jack interface to which the jack plug is inserted, wherein the jack interface detects an electrical change from a mechanical change according to the insertion of the earphone jack plug to the jack interface.

Advantageous Effects

According to the earphone connection detecting system and mobile device supporting the system, the present invention can correctly detect the connection of the earphone without generating the noise.

DETAILED DESCRIPTION OF EXEMPLARY EMBODIMENTS

Figure 1:
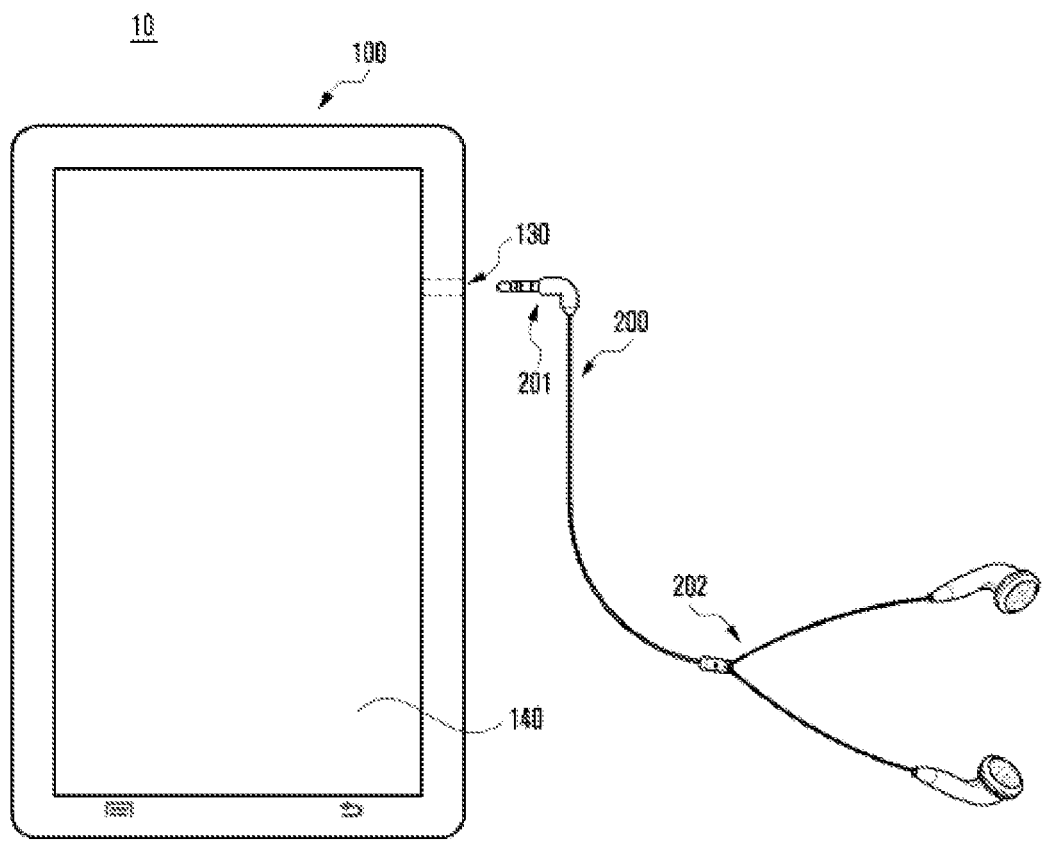
FIG. 1 illustrates a configuration of an earphone connection detecting system according to an embodiment of the invention.

Hereinafter, exemplary embodiments of the invention are described in detail with reference to the accompanying drawings.

Detailed descriptions of well-known functions and structures incorporated herein may be omitted to avoid obscuring the subject matter of the invention. A detailed description of configurations that includes the same elements and performs the same functions will not be explained repeatedly in the description.

Although the drawings represent an embodiment of the invention, the drawings are not necessarily to scale and certain features may be exaggerated or omitted in order to better illustrate and explain the invention. It should be understood that the invention is not limited to the drawing scale.

FIG. 1 illustrates a configuration of an earphone connection detecting system according to an embodiment of the invention.

Referring to FIG. 1, the earphone connection detecting system 10 includes a mobile device 100 and an earphone system 200.

The earphone system 200 includes an earphone jack plug 201, inserted into a jack interface 130 of the mobile device 100, and an earphone output unit 202, connected to the earphone jack plug 201, for outputting audio signals. The earphone jack plug 201 may include three or four contacts according to types of earphone systems. For example, the earphone jack plug 201 may be configured to include a left contact for the left earphone, a right contact for the right earphone, and a ground contact. In addition to the three contacts, the earphone jack plug 201 may further include a microphone contact if the earphone system 200 is implemented with a headset. The earphone output unit 202 includes an earphone left head, connected to the earphone left contact, for outputting a left audio signal, and an earphone right head, connected to the earphone right contact, for outputting a right audio signal. The earphone output unit 202 outputs, if the audio signal is a stereo audio signal, the right and left audio signals via the right and left heads respectively. On the contrary, if the audio signal is a mono audio signal, the earphone output unit 202 outputs the same mono audio signal to the right and left heads.

When the earphone system 200 connects to the mobile device 100, the earphone jack plug 201 is fitted into the jack interface 130. During the process, the earphone jack plug 201 applies a force to a dome key installed to the mobile device 100. The dome key generates an electrical signal according to the magnitude of the received force that is used to detect whether the earphone system 200 is connected to the mobile device 100.

Since the jack interface 130 of the mobile device 100 is electrically isolated from the earphone jack plug 201 of the earphone system 200, the earphone connection detecting system 10 can prevent noise that may be generated by the electrical change during the connection therebetween. In particular, since the mobile device 100 includes a circuit that connects to the dome key, it can process a mechanical change according to the connection of the earphone jack plug 201 to the mobile device 100 as an electrical change and thus correctly detect the insertion of the earphone jack plug 201 to the jack interface 130, irrespective of the states of the earphone jack plug 201.

Although the embodiment is implemented in such a way that the dome key is installed in the jack interface 130 of the mobile device 100 in order to detect the connection of the earphone system 200 to the mobile device 100, it should be understood that the invention is not limited to the embodiment. That is, it should be understood that the dome key is an example of a variety of switching devices according to the invention that are installed in the jack interface 130 of the mobile device 100, are configured such that their out sides are electrically isolated from the other components, and can convert a mechanical change to an electrical signal when the jack plug 201 is inserted to the jack interface 130, so that the earphone connection detecting system 10 can detect the connection without causing electrical short when the earphone system 200 is connected to the mobile device 100. In the following description, the embodiment will be described, employing a dome key as an example of the isolated switching devices.

Figure 2:
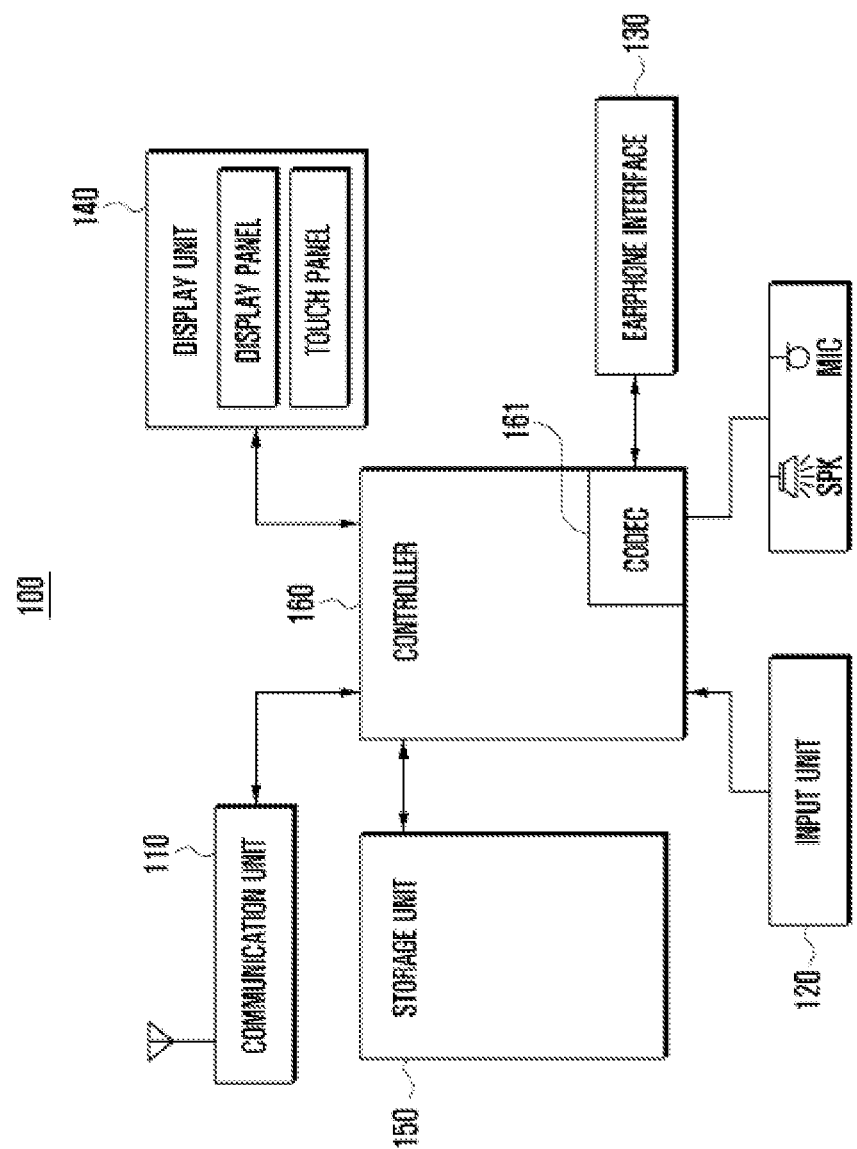
FIG. 2 illustrates a schematic block diagram of a mobile device according to an embodiment of the invention.

FIG. 2 illustrates a schematic block diagram of a mobile device 100 according to an embodiment of the invention.

Referring to FIG. 2, the mobile device 100 includes a communication unit 110, an input unit 120, a jack interface 130, a display unit 140, a storage unit 150, and a controller 16.

When the earphone jack plug 201 of the earphone system 200 is inserted into the jack interface 130 of the mobile device 100, applying a force to the dome key installed to the jack interface 130, the mobile device 100 can detect the mechanical change according to the insertion as an electrical change. To this end, the mobile device 100 includes a circuit for detecting an electrical change corresponding to a mechanical change according to the insertion of the jack plug 201 to the jack interface 130. The circuit is installed to one side of the dome key. When the circuit detects an electrical change, the mobile device 100 identifies the insertion of the earphone jack plug 201 to the jack interface 130. After that, the mobile device 100 may process signals to control the earphone system 200. As such, since the mobile device 100 can detect, via the circuit, an electrical change according to the insertion of the earphone jack plug 201 to the jack interface 130, it can identify the connection of the earphone system 200 thereto, irrespective of the electrical characteristics of the earphone system 200. Alternatively, the mobile device 100 can detect the insertion of the earphone jack plug 201 to the jack interface 130, by using the change in the level of physical pressure according to the insertion, and this can prevent noise from being generated.

The communication unit 110 performs communication in the mobile device 100. If the mobile device 100 doesn't support a communication function, it may not include the communication unit 110. The communication unit 110 may be implemented with a module for providing a mobile communication function to the mobile device 100. The communication unit 110 establishes communication channels with mobile communication systems and transmits/receives signals thereto/therefrom. For example, the communication unit 110 establishes at least one of the channels for voice, video and data with other mobile communication systems, and transmits/receives signals via the channel.

The communication unit 110 may establish a communication channel with an external server or other mobile device, and receive audio signals therefrom. The mobile device 100 may transmit the audio signals, received via the communication unit 110, to the earphone system 200 according to the settings. For example, if the mobile device 100 is connected to a music service server via a communication channel of the communication unit 110, it may receive audio signals and transmits them to the earphone system 200 via the jack interface 130 according to the control of the controller 160.

The input unit 120 generates signals required for the operation of the mobile device 100. The input unit 120 may be implemented with a keyboard, a keypad, key buttons, etc. according to the compatibility of the mobile device 100. If the display unit 140 is implemented with a touch screen, the input unit 120 may be a touch map displayed thereon. The input unit 120 generates a signal for controlling the path of outputting audio signals, according to the insertion of the earphone jack plug 201 to the jack interface 130 of the mobile device 100. For example, if the earphone jack plug 201 of the earphone system 200 is inserted to the jack interface 130 of the mobile device 100, the input unit 120 may generate, according to the user's selection, a signal for selecting one of the modes where the audio signal is output via the earphone system 200 (i.e., earphone output mode) and via the loudspeakers (i.e., speaker output mode). The earphone output mode may be enabled when the earphone jack plug 201 is inserted into the jack interface 130, and disenabled if the earphone jack plug 201 is not inserted thereto.

The jack interface 130 receives the earphone jack plug 201 of the earphone system 200. The jack interface 130 refers to a connector for fixing the inserted earphone jack plug 201. The jack interface 130 includes a number of contacts that contact corresponding contacts of the earphone jack plug 201. The jack interface 130 further includes a dome key that can detect the mechanical change, created during the insertion of the earphone jack plug 201 to the jack interface 130, as an electrical change. A detailed description of the jack interface 130 will be provided later referring to the accompanying drawings.

The display unit 140 provides screen interfaces required for the operation of the mobile device 100, for example, an idle screen, menu screens, etc. In particular, the display unit 140 supports a variety of screen interfaces related to the operation of the earphone system 200. For example, if the jack interface 130 accepts the jack plug 201 of the earphone system 200, the display unit 140 may display a text message or an image informing the user of the insertion of the earphone jack plug 201 on the screen. Alternatively, the display unit 140 may display the text message or image on the screen while the earphone jack plug 201 is being inserted to the jack interface 130 or may display temporarily it when the earphone jack plug 201 is inserted to the jack interface 130. In addition, when the earphone jack plug 201 is removed from the jack interface 130, the display unit 140 may display a text message or image informing the user of the removal on the screen for a certain period of time.

The display unit 140 displays a control map for controlling the audio signal output path of the earphone system 200. The control map includes a key map for selecting one of the output paths of audio signals from the mobile device 100 to the speaker and from the mobile device 100 or to the earphone system 200 via the jack interface 130 and the earphone jack plug 201. To this end, the display unit 140 may be implemented with a touch screen with a display panel and a touch panel. In that case, the display panel may display the image corresponding to the control map, etc. The touch panel sets a touch effective area and a non-touch effective area in order to control the control map displayed on the display panel, and transfers a signal corresponding to a touch event that occurs on the touch effective area to the controller 160.

The speaker outputs audio signals generated when the mobile device 100 plays back audio files and is operated. If the mobile device 100 supports a communication function and a function for transmitting the user's voice, it may further includes a microphone. In particular, if the mobile device 100 connects to the earphone system 200, the speaker may not output audio signals. When the earphone jack plug 201 of the earphone system 200 is removed from the jack interface 130 of the mobile device 100, the speaker may output audio signals under the control of the controller 160.

The storage unit 150 stores an operating system of the mobile device 100, and application programs for executing functions and related to algorithms, according to the invention. The storage unit 150 also stores audio files corresponding to audio data that will be output to the speaker and the earphone system 200. When the audio files are played back according to the user's request, the audio signals are output to the speaker or the earphone system 200 if it is connected to the mobile device 100.

The controller 160 controls the signals flowing among the components in the mobile device 100. The controller 160 controls the transmission, process, deletion, and correction with respect to information.

The controller 160 may include a port for detecting the connection of the earphone system 200 to the mobile device 100, via the dome key that coverts a mechanical change to an electrical change according to the insertion of the earphone jack plug 201 to the jack interface 130. The detection port includes a signal line connected to the circuit connected to the dome key. The controller 160 can detect, via the detection port, a signal corresponding to the electrical change generated when the dome key is pressed according to the insertion of the earphone jack plug 201 to the jack interface 130. In that case, the controller 160 outputs signals to the earphone system 200. That is, if the controller 160 identifies the insertion of the earphone jack plug 201 to the jack interface 130, it outputs audio signals to the earphone system 200, via the ports connected to the right and left contacts of the earphone jack plug 201 respectively. To this end, the controller 160 includes a coder and decoder (CODEC) 161. The CODEC 161 includes a detection port, and right and left ports. The jack interface 130 of the mobile device 100 and the earphone jack plug 201 of the earphone system 200 will be described in detail as follows, referring to the accompanying drawings.

Figure 3:
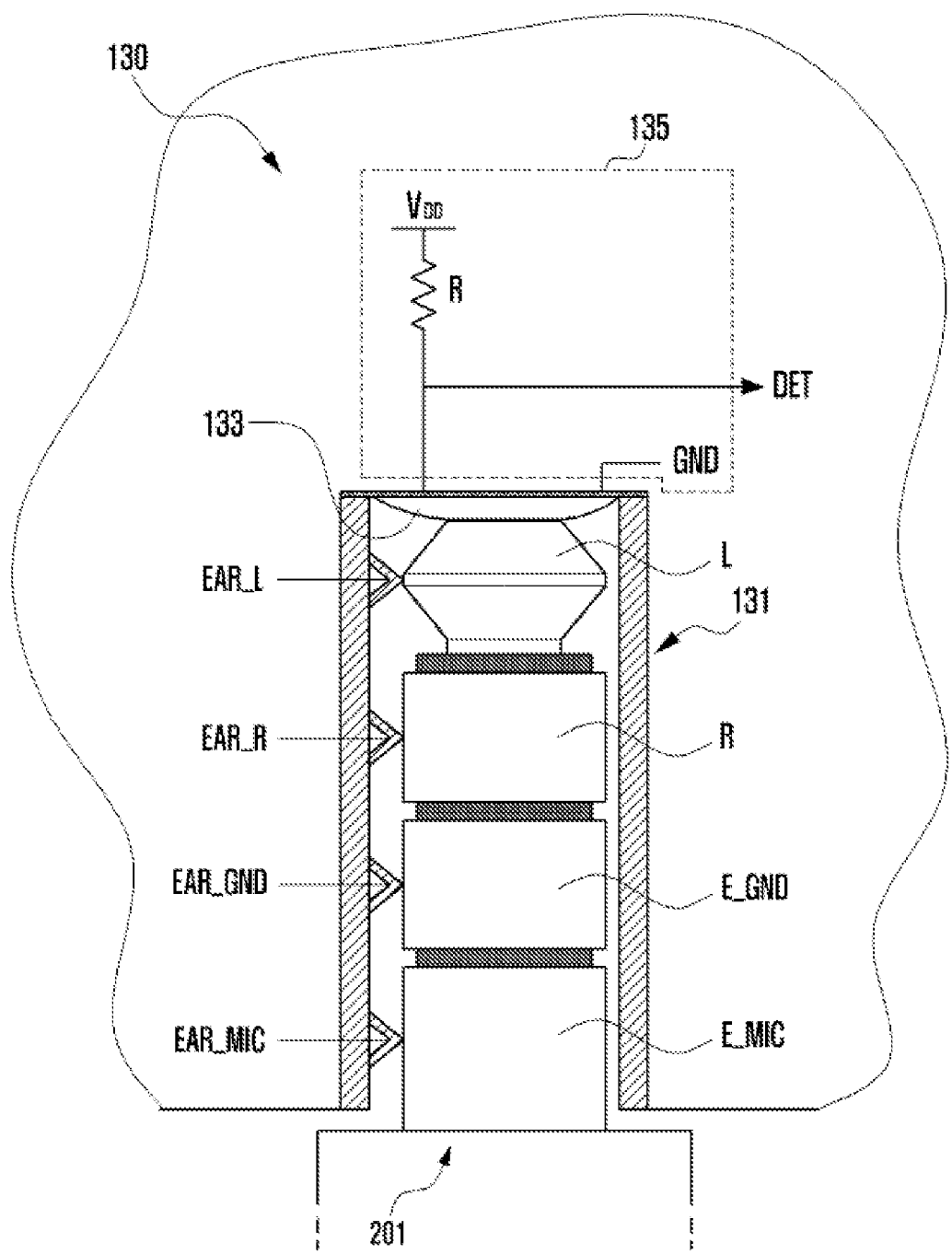
FIG. 3 illustrates a schematic view showing the configuration of an earphone jack plug and a jack interface of the earphone connection detecting system according to a first embodiment of the invention.

FIG. 3 illustrates a schematic view showing the configuration of an earphone jack plug 201 and a jack interface 130 of the earphone connection detecting system according to a first embodiment of the invention, when the jack plug 201 is inserted to the jack interface 130.

Referring to FIG. 3, the earphone jack plug 201 has left L and right R audio signal plug contacts, a ground plug contact E_GND, and a microphone plug contact E_MIC, in order, from the tip. The contacts of the jack plug 201 are electrically isolated from each other via isolation members or rings. In an embodiment of the invention, although the earphone jack plug 201 inserted to the jack interface 130 includes four contacts, it should be understood that the invention is not limited to the embodiment. For example, the earphone jack plug 201 may be modified in such a way to include three contacts, left L and right R audio signal plug contacts, and a ground plug contact E_GND, without the microphone plug contact E_MIC. Alternatively, the earphone jack plug 201 may also be modified in such a way that the position of the ground plug contact E_GND of the four contacts is exchanged with that of the other plug contact. That is, the earphone jack plug 201 inserted to the jack interface 130 of the mobile device 100, according to the invention, can be applied to conventional earphone systems. In the following description, the embodiment will be described based on the earphone jack plug 201 with four plug contacts as shown in FIG. 3.

The jack interface 130 of the mobile device 100 is designed to have a cavity 131 that is long to receive the earphone jack plug 201. The cavity 131 forms jack contacts on the inner wall at locations in such a way as to contact the contacts of the jack plug 201. That is, the cavity 131 includes a left audio signal jack contact EAR_L that contacts the left audio signal plug contact L, a right audio signal jack contact EAR_R that contacts the right audio signal plug contact R, a ground jack contact EAR_GND that contacts the ground plug contact E_GND, and a microphone jack contact EAR_MIC that contacts the microphone plug contact E_MIC. In particular, the jack interface 130 is designed in such a way that the dome key 133 is formed on the deepest bottom and the detection circuit 135 is placed near the dome key 133, so that the dome key 133 is mechanically pressed by the tip of the earphone jack plug 201 and the detection circuit 135 converts the mechanical change of the dome key 133 to an electrical signal and transfers it to the controller 160.

When the earphone jack plug 201 of the earphone system 200 is inserted to the jack interface 130 of the mobile device 100, the tip of the jack plug 201 presses the dome key 133 of the cavity 131, thereby generating a mechanical deformation to a switching circuit in the dome key 133. In that case, the detection circuit 135 connected to the switching circuit converts the mechanical change of the dome key 133 to the electrical change and transfers the corresponding signal to the controller 160.

The jack interface 130 is designed in such a way that the earphone jack plug 201 is fitted into the cavity 131 so that it cannot be easily removed therefrom. For example, if the cavity 131 of the interface 130 has the inner diameter of 3.5 Ø, the jack plug 201 has also the same size in the external diameter. The jack interface 130 may also be designed in such a way that the internal wall of the cavity 131 is made of an elastic material to hold the earphone jack plug 201 inserted therein. In that case, the jack contacts of the interface 130 may be protrudent from the inner wall of the cavity 131 so that they can correctly contact the plug contacts of the earphone jack plug 201.

In particular, the jack interface 130 is designed in such a way that the cavity 131 has a depth so that the dome key 133 placed on the bottom or at the deepest location can be pressed by the jack plug 201 when it is completely fitted into the cavity 131, and physically deformed by the mechanical pressure. For example, the cavity 131 may be formed to have a depth in such a way that: the depth between the top of the dome key 133, when it doesn't receive an external force, and the opening of the cavity 131 is less than the length of the entire contact of the jack plug 201; and the depth between the top of the dome key 133, when it receives an external force by the jack plug 201, and the opening of the cavity 131 is similar to the length of the entire contact of the jack plug 201.

Figure 4:
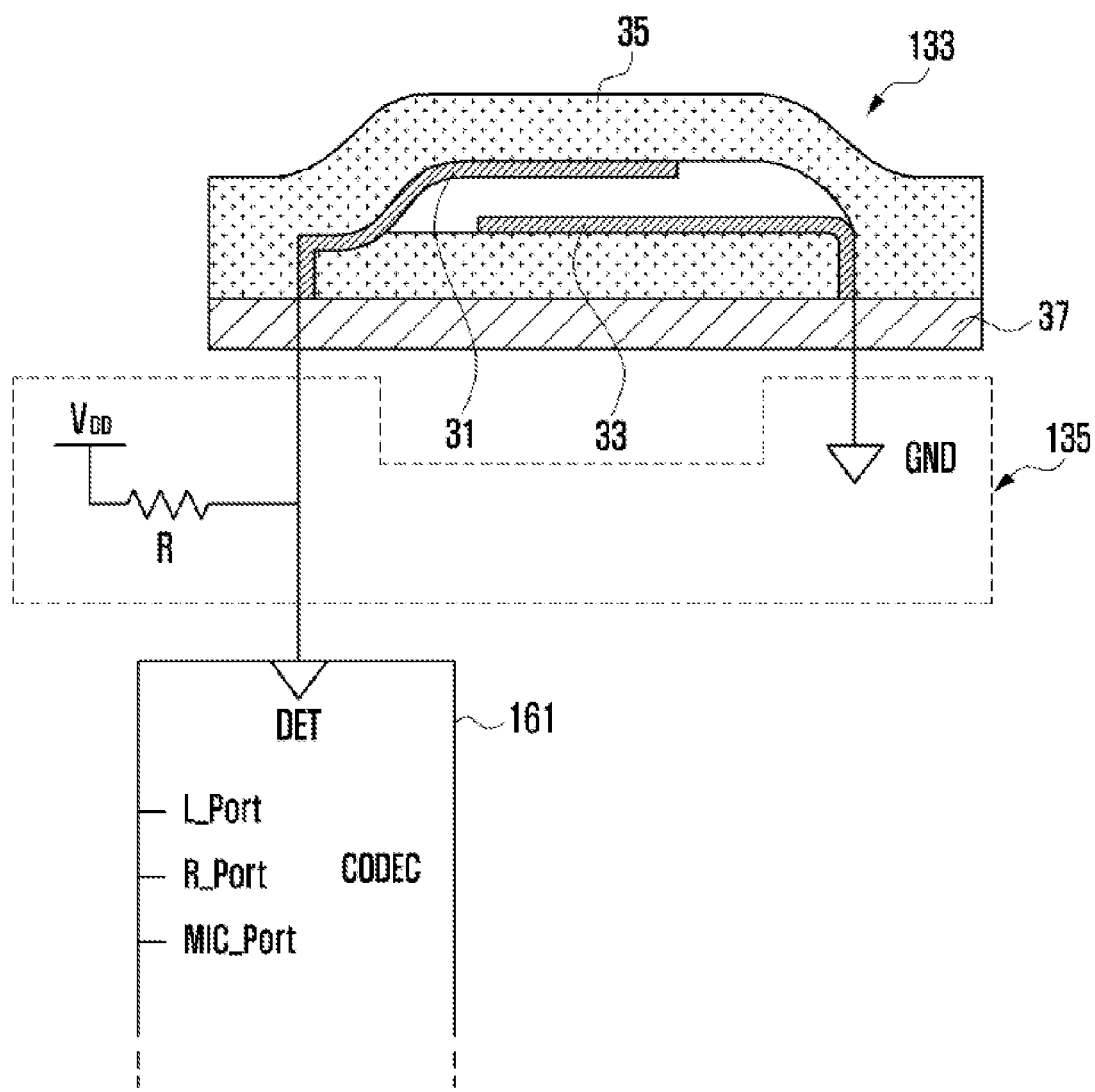
FIG. 4 illustrates a cross-sectional view of a dome key and circuit components related to the key, according to an embodiment of the invention.

FIG. 4 illustrates a cross-sectional view of a dome key 133 and circuit components related to the key, according to an embodiment of the invention.

Referring to FIG. 4, the dome key 133 includes a first switch electrode 31, a second switch electrode 33, an isolation layer 35, and an adhesive layer 37. The adhesive layer 37 may be implemented with a variety of fixing members if they can fix the dome key 133 to the bottom of the jack interface 130, for example, screws. If the dome key 133 is designed in such a way that both sides are equipped with hooks, the adhesive layer 37 may be members to be coupled with the hooks. The adhesive layer 37 fix the dome key 133 to the bottom of the jack interface 130.

The detection circuit 135 is configured in such a way that a pull-up resistor R is connected to a node on a wire connecting the first switch electrode 31 and the detection port DET of the CODEC 161; a reference voltage source VDD outputs a certain level of voltage via the pull-up resistor R; and the ground electrode GND connects to the second switch electrode 33.

The dome key 133 is configured in such a way that the first switch electrode 31 and the second switch electrode 33 are spaced apart from each other by a certain distance. The dome key 133 is placed in the isolation layer 35. If the isolation layer 35 experiences an external force, the first switch electrode 31 contacts the second switch electrode 33. In that case, since the first 31 and second 33 electrodes are grounded to the ground electrode GND, the node connecting the pull-up resistor R and the detection port DET goes to ground. Therefore, the CODEC 161 receives a signal corresponding to the electrical change via the detection port DET. That is, the CODEC 161 detects the change in the input voltage level of the detection port DET from the voltage level of VDD to the ground level. As such, the CODEC 161 can identify the insertion of the earphone jack plug 201 to the jack interface 130 by detecting the input voltage level at the detection port DET.

Meanwhile, since the first 31 and second 33 switch electrodes of the dome key 133 are covered with the isolation layer 35 and electrically isolated from the outside, they don't contact the earphone jack plug 201 when the plug 201 applies a physical force to the dome key 133. Therefore, when the dome key 133 experiences a physical force, the detection circuit 135 generates an electrical change corresponding to the physical force, and the CODEC 161 thus identifies the insertion of the earphone jack plug 201 to the jack interface 130 irrespective of the electrical state of the earphone system 200. If the earphone jack plug 201 is inserted to the jack interface 130, the CODEC 161 enables the left audio signal port L_Port, the right audio signal port R_Port, and a microphone signal port MIC_Port to transmit/receive signals to/from the left audio signal jack contact EAR_L, the right audio signal jack contact EAR_R, and the microphone jack contact EAR_MIC of the jack interface 130, via signal lines.

Figure 5:
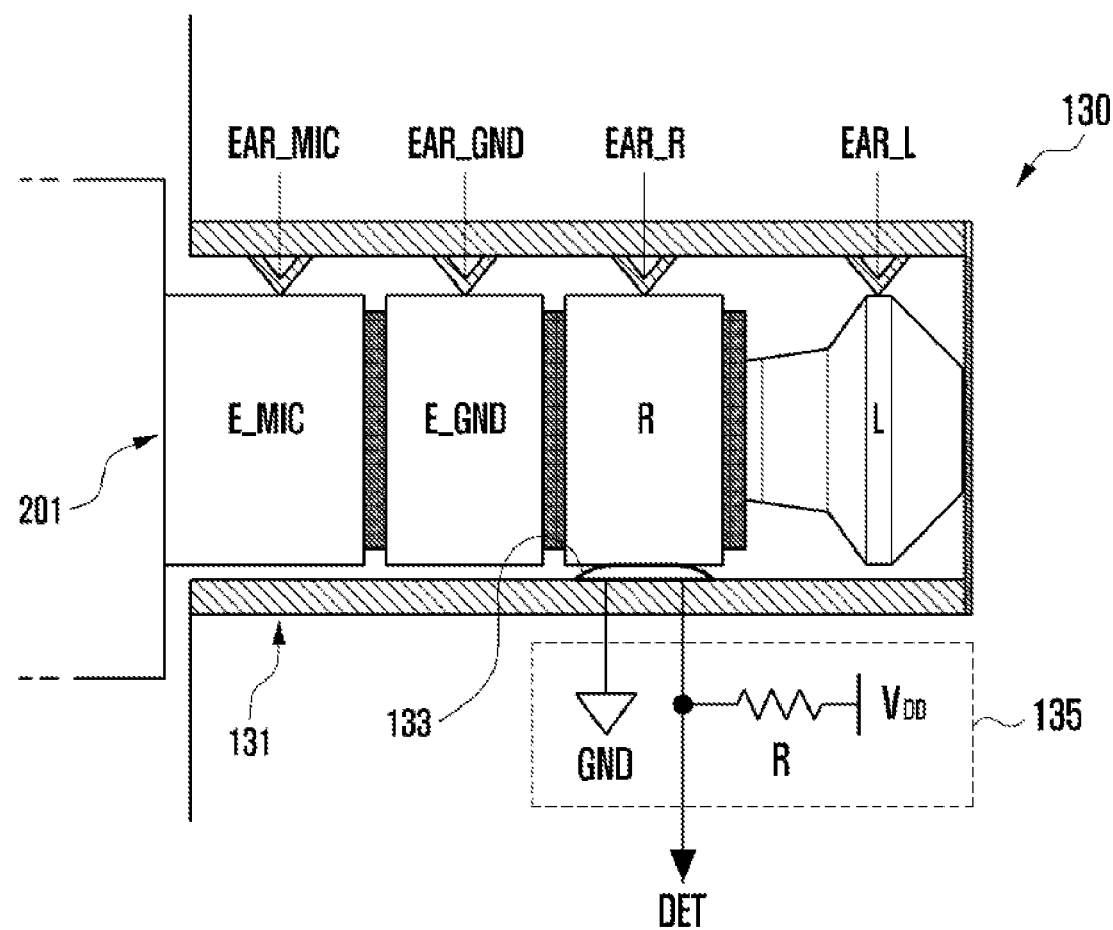
FIG. 5 illustrates a schematic view showing the configuration of an earphone jack plug and a jack interface of the earphone connection detecting system according to a second embodiment of the invention.

FIG. 5 illustrates a schematic view showing the configuration of an earphone jack plug 201 and a jack interface 130 of the earphone connection detecting system 10 according to a second embodiment of the invention.

Referring to FIG. 5, the jack interface 130 of the mobile device 100 forms a dome key 133 on the inner wall. The earphone jack plug 201 includes four contacts, i.e., left L and right R audio signal plug contacts, a ground plug contact E_GND, and a microphone plug contact E_MIC, in order, from the tip.

The jack interface 130 includes a cavity 131, a dome key 133 formed on the inner wall of the cavity 131, and a number of contacts on the inner wall of the cavity 131. The cavity 131 is long to receive the earphone jack plug 201. The contacts are a left audio signal jack contact EAR_L that contacts the left audio signal plug contact L, a right audio signal jack contact EAR_R that contacts the right audio signal plug contact R, a ground jack contact EAR_GND that contacts the ground plug contact E_GND, and a microphone jack contact EAR_MIC that contacts the microphone plug contact E_MIC. In particular, the cavity 131 of the interface 130 has an inner diameter similar to the external diameter of the earphone jack plug 201, for example, 3.5 Ø. The inner wall of the cavity 131 forms a layer made of a material with elasticity and high frictional coefficient, non-conductivity, e.g., rubber, synthetic rubber, polyurethane, etc., so that the earphone jack plug 201 fitted into the cavity 131 cannot be easily removed therefrom.

As shown in FIG. 5, the jack interface 130 may form at least one dome key 133 on the inner wall of the cavity 131. The dome key 133 contacts the side of the earphone jack plug 201 and experiences a physical force according to the insertion of the plug 201 to the cavity of the jack interface 130. In that case, the dome key 133 converts the physical force to an electrical change and transfers the signal to the CODEC 161.

As described above referring to FIG. 4, since the first 31 and second 33 switch electrodes of the dome key 133 are covered with the isolation layer 35 and electrically isolated from the outside, they don't contact the earphone jack plug 201 when the plug 201 applies a physical force to the dome key 133. That is, the dome key 133 can convert the physical force to an electrical change without electrically contacting the earphone jack plug 201.

Although the second embodiment is implemented in such a way that the dome key 133 is formed on the inner wall at a place corresponding to a position of the right audio signal plug contact R of the earphone jack plug 201, it should be understood that the invention is not limited to the embodiment. For example, the dome key 133 may be formed on the inner wall at a place corresponding to a position of any one of the remaining contacts of the earphone jack plug 201, i.e., the left audio signal plug contact L, the ground plug contact E_GND, and the microphone plug contact E_MIC. Meanwhile, the second embodiment may be modified in such a way that the jack interface 130 may form a number of dome keys on the inner wall. This configuration is advantageous in that, if one of a number of dome keys is broken down, the remaining dome keys can convert the physical force to an electrical change and transfer the corresponding signal to the detection circuit, so that the connection detection system can identify the insertion of the earphone jack plug 201 to the jack interface 130.

As described above, the earphone connection detecting system and the mobile device with the system, according to the invention, can correctly detect the connection of an earphone to the mobile device, without generating noise.

Although it is not shown in the drawings, the mobile device may selectively further include various types of components, for example: a short-range communication module for short-range communication; a camera module for acquiring still images/videos; an interface for transmitting/receiving data in a wireless or weird mode; an Internet communication module; and a digital broadcast module for receiving and reproducing broadcasts. With the spread of digital convergence, although it is impossible to list all the modifications of mobile devices in this description, it will be easily appreciated to those skilled in the art that the other components equivalent to the above-listed components may be further included to the mobile device according to the invention. Also, it will be appreciated that, according to the purposes, the mobile device may be implemented by omitting a particular component or replacing it with other components.

The mobile device according to the invention includes all information communication devices, multimedia devices, and their applications, which include an earphone interface that various types of jacks for earphones are plugged into and are operated according to communication protocols corresponding to various types of communication systems. For example, the mobile device can be applied to mobile communication terminals, Portable Multimedia Players (PMPs), digital broadcast players, Personal Digital Assistants (PDAs), audio players (e.g., MP3 players), mobile game players, smartphones, laptop computers, hand-held PC, etc.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application. Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

DESCRIPTION OF REFERENCE NUMERALS

10: earphone connection detecting system
100: device
110: communication unit
120: input unit
130: earphone interface
131: cavity
133: dome key
135: detection circuit
140: display unit
150: storage unit
160: controller
200: earphone
201: earphone jack plug
202: earphone output unit

What is claimed is:

1. An earphone connection detecting system comprising:
an earphone system comprising an output control unit and an earphone jack plug connected to the output control unit, wherein the output control unit outputs audio signals to the earphone jack plug; and
a mobile device with a jack interface to which the earphone jack plug is inserted, wherein the jack interface detects an electrical change from a mechanical change according to the insertion of the earphone jack plug into the jack interface,
wherein the jack interface comprises a cavity to which the earphone jack plug is inserted; and
wherein the mobile device comprises:
a switching device, disposed in the cavity, for performing a switching operation by a physical force according to the insertion of the earphone jack plug into the cavity, the switching device comprising an isolation layer of a preset thickness and first and second switch electrodes spaced apart from each other by a certain distance and disposed on the isolation layer.

2. The earphone connection detecting system of claim 1, wherein the mobile device further comprises:
a detection circuit, electrically connected to the switching device, for generating an electrical change according to the switching operation of the switching device; and
a controller, connected to the detection circuit, for detecting a connection of the earphone system to the mobile device via the electrical change.

3. The earphone connection detecting system of claim 1, further comprising:
a member for fixing the switching device into the cavity of the jack interface.

4. The earphone connection detecting system of claim 1, wherein the detection circuit comprises:
a pull-up resistor connected to the first switch electrode;
a reference voltage source connected to the pull-up resistor;
a ground electrode connected to the second switch electrode; and
a signal line connecting the pull-up resistor and the controller.

5. The earphone connection detecting system of claim 2, wherein the switching device is disposed on a bottom of the cavity of the jack interface and contacts a tip of the earphone jack plug.

6. The earphone connection detecting system of claim 2, wherein the switching device is disposed on an inner wall of the jack interface at one or more places corresponding to positions of contacts of the earphone jack plug.

7. A mobile device that supports an earphone connection detecting system, the mobile device comprising:
a jack interface comprising a cavity to which an earphone jack plug of an earphone system is inserted;
a switching device, disposed in the cavity, for performing a switching operation by a physical force according to the insertion of the earphone jack plug into the cavity, the switching device comprising an isolation layer of a preset thickness and first and second switch electrodes spaced apart from each other by a certain distance, disposed in the isolation layer;
a detection circuit, electrically connected to the switching device, for generating an electrical signal according to the switching operation of the switching device; and a controller, connected to the detection circuit, for detecting the insertion of the earphone jack plug into the jack interface via the electrical signal.

8. The mobile device of claim 7, further comprising:
a member for fixing the switching device into the cavity of the jack interface.

9. The mobile device of claim 1, wherein the detection circuit comprises:
a pull-up resistor connected to the first switch electrode;
a reference voltage source connected to the pull-up resistor;
a ground electrode connected to the second switch electrode; and
a signal line connecting the pull-up resistor and the controller.

10. The mobile device of claim 7, wherein the switching device is disposed on a bottom of the cavity of the jack interface and contacts a tip of the earphone jack plug.

11. The mobile device of claim 7, wherein the switching device is disposed on an inner wall of the jack interface at one or more places corresponding to positions of contacts of the earphone jack plug.

12. A jack interface system comprising:
a cavity in which an earphone jack plug of an earphone system is inserted;
a switching device, disposed in the cavity, for performing a switching operation according to a physical force exerted by the earphone jack plug on the switching device when inserting the earphone jack plug into the cavity, the switching device comprising an isolation layer of a preset thickness and first and second switch electrodes spaced apart from each other by a certain distance, disposed in the isolation layer;
a detection circuit, electrically connected to the switching device, for generating an electrical signal according to the switching operation of the switching device; and
a controller, connected to the detection circuit, for detecting the insertion of the earphone jack plug into the jack interface via the electrical signal.

13. The jack interface system of claim 12, further comprising:
a member for fixing the switching device into the cavity of the jack interface.

14. The jack interface system of claim 12, wherein the detection circuit comprises:
a pull-up resistor connected to the first switch electrode;
a reference voltage source connected to the pull-up resistor;
a ground electrode connected to the second switch electrode; and
a signal line connecting the pull-up resistor and the controller.

15. The jack interface system of claim 12, wherein the switching device is disposed on a bottom of the cavity of the jack interface and contacts a tip of the earphone jack plug.

16. The jack interface system of claim 12, wherein the switching device is disposed on an inner wall of the jack interface at one or more places corresponding to positions of contacts of the earphone jack plug.

* * * * *